United States Patent
Appiah et al.

(10) Patent No.: US 10,417,200 B2
(45) Date of Patent: Sep. 17, 2019

(54) DATA MIGRATION FOR SERVICE UPGRADES

(75) Inventors: Madan Appiah, Redmond, WA (US); Nitin Sharma, Sammamish, WA (US); Lokesh M. Dave, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 177 days.

(21) Appl. No.: 12/847,485

(22) Filed: Jul. 30, 2010

(65) Prior Publication Data

US 2012/0030167 A1 Feb. 2, 2012

(51) Int. Cl.
*G06F 7/00* (2006.01)
*G06F 16/21* (2019.01)
*G06F 16/957* (2019.01)

(52) U.S. Cl.
CPC ........ *G06F 16/214* (2019.01); *G06F 16/9574* (2019.01)

(58) Field of Classification Search
CPC .................................................. G06F 16/9574
USPC ........................................ 707/705, 706, 610
See application file for complete search history.

(56) References Cited

U.S. PATENT DOCUMENTS

| | | | |
|---|---|---|---|
| 6,282,542 B1 * | 8/2001 | Carneal | H04B 7/18582 |
| 6,714,937 B1 * | 3/2004 | Eynon et al. | 705/26.5 |
| 7,072,913 B2 | 7/2006 | Jans et al. | |
| 7,080,221 B1 * | 7/2006 | Todd | G06F 3/0605 |
| | | | 707/999.201 |
| 7,313,792 B2 | 12/2007 | Buban et al. | |
| 7,558,843 B2 | 7/2009 | Lipscomb et al. | |
| 2001/0008024 A1 | 7/2001 | Inaba | |
| 2004/0015950 A1 | 1/2004 | Dutta et al. | |
| 2006/0020636 A1 * | 1/2006 | Murotani | 707/200 |
| 2006/0155773 A1 * | 7/2006 | Drouet | G06F 9/4451 |
| 2006/0271925 A1 * | 11/2006 | Schuelein | G06F 8/65 |
| | | | 717/168 |

(Continued)

OTHER PUBLICATIONS

Migration of Service and Customer Data in Intelligent Network Applications—Published Date: Feb. 19, 2001 http://citeseerx.ist.psu.edu/viewdoc/download?doi=10.1.1.1.1756&rep=rep1&type=pdf (47 pages).

(Continued)

*Primary Examiner* — Eliyah S. Harper
(74) *Attorney, Agent, or Firm* — Workman Nydegger (57) ABSTRACT

Embodiments are directed to efficiently migrating data from one version of a service to another version and to temporarily transitioning a user to a different service for evaluation. A computer system pre-transfers user data from a first service to a second, different service before an indication is received that the user is to be transitioned from the first service to the second service. The user data includes identification information identifying users of the first service. The computer system receives an indication that a first service user is to be transitioned to the second service. The computer system transfers service data used by the first service to the second service and synchronizes any changes in the user data that occurred between the user data pre-transfer and the service data transfer, so that the second service is provided using the transferred service data and the synchronized user data.

20 Claims, 4 Drawing Sheets

(56) References Cited

U.S. PATENT DOCUMENTS

| | | | |
|---|---|---|---|
| 2007/0033236 A1 | 2/2007 | Kaneko et al. | |
| 2007/0061355 A1* | 3/2007 | Carey | H04L 41/00 |
| 2007/0156849 A1 | 7/2007 | Becker | |
| 2008/0082547 A1* | 4/2008 | Hwang | G06Q 10/10 |
| 2008/0320040 A1* | 12/2008 | Zhurakhinskaya | G06Q 10/10 |
| 2009/0037515 A1* | 2/2009 | Zapata | H04L 43/0811 709/202 |
| 2009/0228527 A1* | 9/2009 | Wang | G06F 3/0617 |
| 2009/0248695 A1* | 10/2009 | Ozzie | H04L 67/2861 |
| 2009/0265425 A1* | 10/2009 | Lipscomb | G06Q 30/0601 709/203 |
| 2009/0287745 A1* | 11/2009 | Imine | G06F 11/3476 |

OTHER PUBLICATIONS

"Second Office Action Issued in China Patent Application No. 201110221876.5", dated Jul. 2, 2014, 10 Pages.

"First Office Action and Search Report Received in China Patent Application No. 201110221876.5", dated Oct. 14, 2013, Filed Date: Jul. 29, 2011, 12 Pages.

* cited by examiner

DATA MIGRATION FOR SERVICE UPGRADES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, software applications may provide services to various computer system users. In some cases, these services may be provided to customers on a subscription basis. The customers will typically log in to the server or computer system providing the service and, once authenticated, the user will have access to the service.

Over time, service providers tend to make changes to the services they provide. The changes may be implemented in the form of a new service version. In some cases, the new version may differ substantially from the original (or last) version. In such cases, the user may be hesitant to change to the newer version without having tried it. Moreover, effecting such changes may require a great deal of time and effort on the part of the user.

BRIEF SUMMARY

Embodiments described herein are directed to efficiently migrating data from one version of a service to another version and to temporarily transitioning a user to a different service for evaluation. In one embodiment, a computer system pre-transfers user data from a first service to a second, different service before an indication is received that the user is to be transitioned from the first service to the second service. The user data includes identification information identifying users of the first service. The computer system receives an indication that a first service user is to be transitioned to the second service. The computer system transfers service data used by the first service to the second service and synchronizes any changes in the user data that occurred between the user data pre-transfer and the service data transfer, so that the second service is provided using the transferred service data and the synchronized user data.

In another embodiment, a computer system transfers a user's user data from a first service to a second service before receiving an indication that the user intends to evaluate the second service. The computer system receives an indication that the user intends to evaluate the second service and temporarily transfers service data corresponding to the first service to the second service, so that the second service operates using the user's user data and service data from the first service. The user data and service data may be updated during service operation. The computer system also determines that the user's evaluation period has ended and may be transferred the updated user data and service data from the second service to the first service, so that the first service operates using the updated user data and service data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to efficiently migrating data from one version of a service to another version and to temporarily transitioning a user to a different service for evaluation. In one embodiment, a computer system pre-transfers user profile data from a first service to a second, different service before an indication is received that the user is to be transitioned from the first service to the second service. The user profile data may include a user's first name, last name, address, etc. as well as user identification and authentication data including user ID, password, etc. The user data includes identification information identifying users of the first service. The computer system receives an indication that a first service user is to be transitioned to the second service.

The computer system transfers service data used by the first service to the second service and synchronizes any changes in the user data that occurred between the user data pre-transfer and the service data transfer, so that the second service is provided using the transferred service data and the synchronized user data. Service data, as used herein, may refer to data pertaining to a given service but also relevant to a user (e.g. a user's email inbox) or to a company (e.g. the company's word processing documents). Furthermore, it should be noted that, at least in some cases, synchronization may occur only during the transfer of a user from a first service to a second service. In such cases, once the service transition is complete and indicated to user then the synchronization stops, as the user's move from the first service to the second service is complete.

In another embodiment, a computer system transfers a user's user data from a first service to a second service before receiving an indication that the user intends to evaluate the second service. The computer system receives an indication that the user intends to evaluate the second service and temporarily transfers service data corresponding to the first service to the second service, so that the second service operates using the user's user data and service data from the first service. The user data and service data are updated during service operation. The computer system also determines that the user's evaluation period has ended and transfers the updated user data and service data from the second service to the first service, so that the first service operates using the updated user data and service data.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
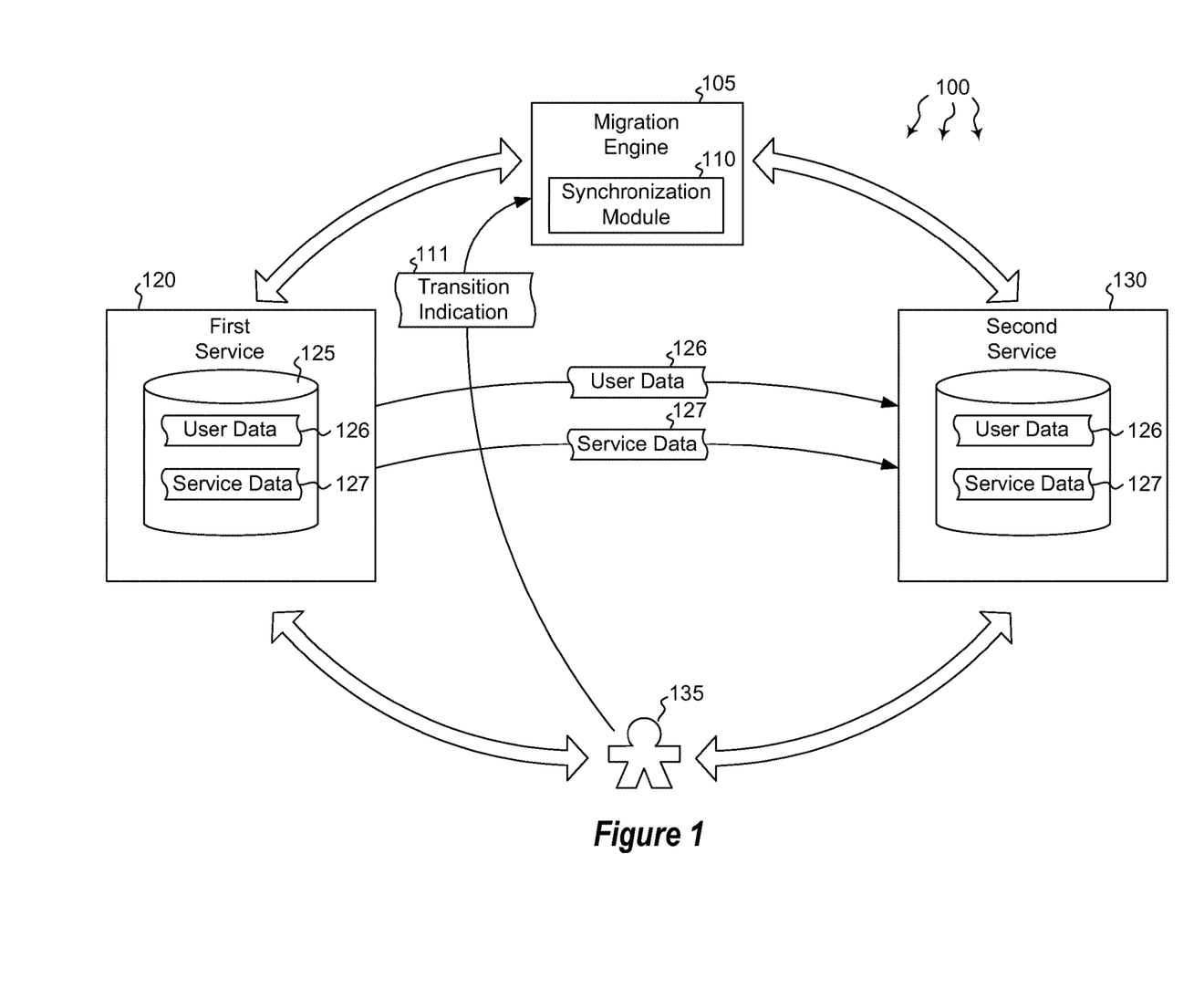
FIG. 1 illustrates a computer architecture in which embodiments of the present invention may operate including efficiently migrating data from one version of a service to another version and temporarily transitioning a user to a different service for evaluation.

FIG. 1 illustrates a computer architecture 100 in which the principles of the present invention may be employed. Computer architecture 100 includes first service 120 and second service 130. Each of these services includes user data 126 and service data 127. The services may be any type of software service, application, function or other hardware/software combination that provides a portion of functionality to a user. In some cases, second service 130 may comprise a newer or updated version of first service 120. Thus, as shown in FIG. 1, user 135 may be upgrading or simply switching between service versions. Migration engine 105 may be used to perform such service migrations.

Migration engine 105 may be configured to transfer data between first service 120 and second service 130. For instance, migration engine 105 may transfer (or initiate the transfer of) user data 126 and/or service data 127 from the first service to the second service. The migration engine may transfer at least a portion of the user data and/or the service data for user 135 before the user has indicated that he or she wishes to switch to the newer version. In such cases, because the data has already been transferred to the newer version (i.e. second service 130), the second service can be provided quickly and efficiently. It should be noted that while two services are shown in FIG. 1, substantially any number of services may be implemented and, correspondingly, migration engine 105 may be configured to facilitate upgrades between services or service versions for substantially any number of users.

Each service may be configured to provide its functionality to one or more different users (e.g. user 135). The service provides the functionality using the user data 126 and service data 127 stored in data store 125. The user data may include any type of information used to identify the user including user name, authentication information, biographical information (name, address, etc.), email address or other identifying information. Moreover, the user data 126 may identify the user as part of a group of users or as a corporate customer. The service data 127 may include any type of information related to the service being provided including which functionality to provide to given user or group of users, user settings, as well as the actual data that provides the service's functionality.

Thus, migration engine 105 may determine when to begin sending a user's user data 126 and/or service data 127 from an older version (e.g. first service 120) to a newer version (e.g. second service 130). In some cases, the migration engine may begin sending the user data and/or service data before receiving an indication (e.g. transition indication 111) from a user that the user wishes to upgrade or switch to the newer (or simply different) version. In some embodiments, migration engine 105 may pre-transfer the user data 126 for any or all users of the first service to the data store or data partition of the second service. Then, upon receiving a transition indication 111 from the user 135 indicating that the user wishes to switch to the second version, the migration engine may transfer the service data 127, as well as initiate a synchronization via synchronization module 110 to synchronize any data changes in the user data. This and other concepts will be explained in greater detail below with regard to method 200 of FIG. 2.

Figure 2:
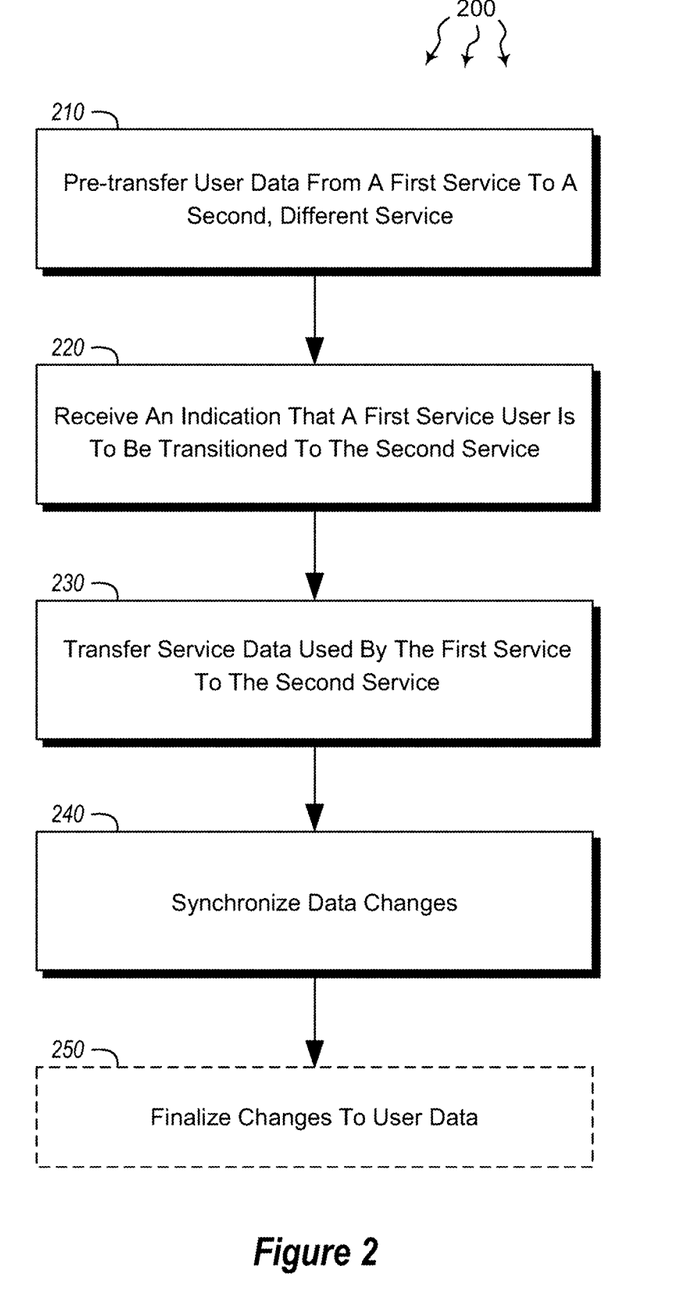
FIG. 2 illustrates a flowchart of an example method for efficiently migrating data from one version of a service to another version.
Figure 3:
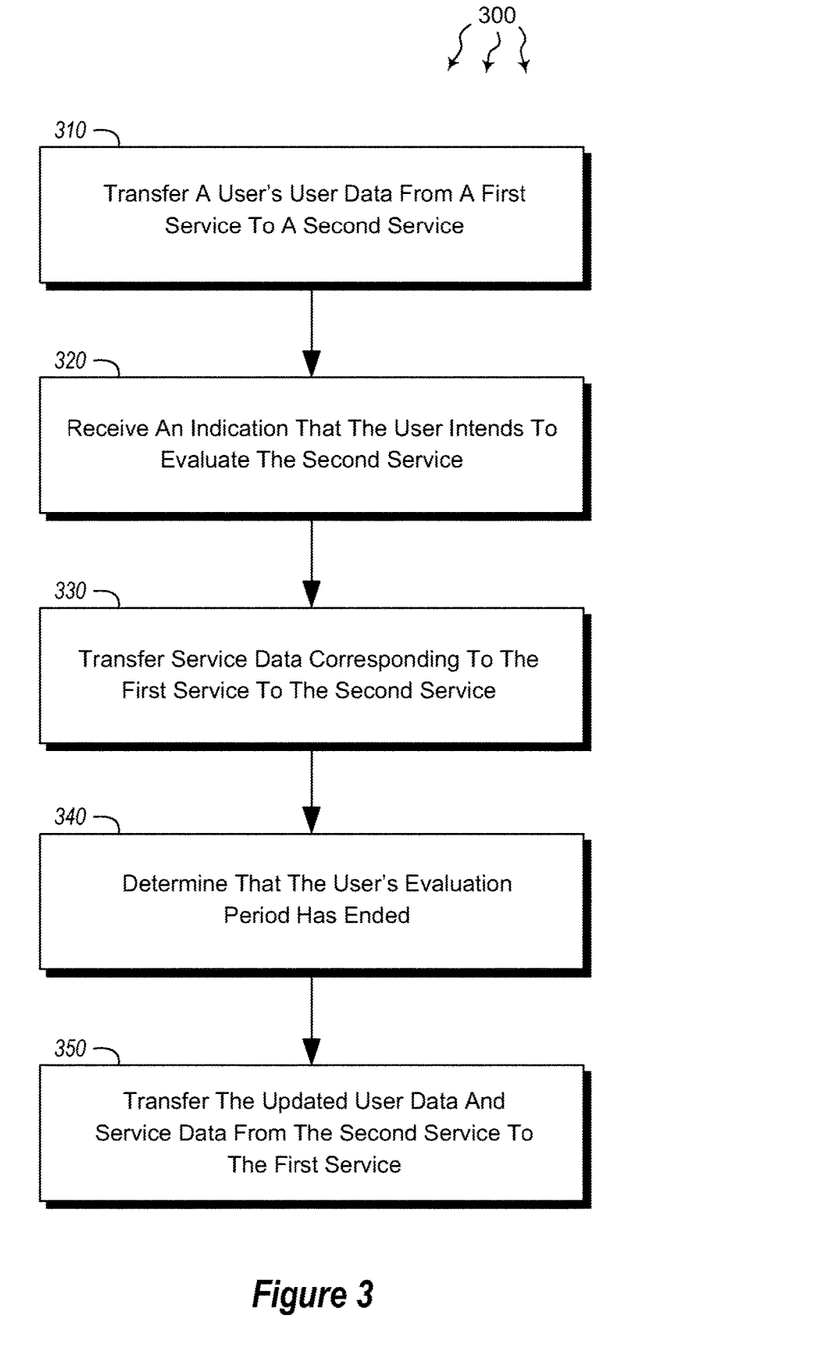
FIG. 3 illustrates a flowchart of an example method for temporarily transitioning a user to a different service for evaluation.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently migrating data from one version of a service to another version. The method 200 will now be described with frequent reference to the components and data of environment 100 of FIG. 1 and environment 400 of FIG. 4.

Method 200 includes an act of pre-transferring at least a portion of user data from a first service to a second, different service before an indication is received that the user is to be transitioned from the first service to the second service, wherein the user data includes identification information identifying one or more users of the first service (act 210). For example, migration engine 105 may pre-transfer at least a portion of user data 126 from first service 120 to second service 130 before receiving transition indication 111 from user 135 indicating that the is to be transitioned from the first service to the second service. User data 126 may include information that identifies the user requesting the transition (user 135) to a different version or different service. As indicated above, the user data may further indicate the user's membership in a group or other organizational unit. The user's level of access to various features of the service(s) may be limited or granted based on the user's membership in the group. In some embodiments, second service 130 (e.g. a newer or updated version of the service provided by first service 120) may comprise a multi-partition, multi-tenant service. In such cases, each user or tenant may have its own actual or virtual partition in which its user and service data is stored.

Method 200 includes an act of receiving an indication that one or more of the first service users are to be transitioned to the second service (act 220). For example, migration engine 105 may receive transition indication 111 from user 135 indicating that the user is to be transitioned from the first service 120 to the second service 130. In some cases, migration engine 105 may be configured to monitor a user upgrade status for at least one of the first service users (e.g. user 135). The user upgrade status may indicate that the user is eligible for upgrade or, at least, is eligible to temporarily evaluate the newer version. Thus, in such cases, migration engine 105 may begin pre-transferring user and/or service data upon learning that a given user is eligible to upgrade to (or evaluate) the newer version. Then, when the eligible user actually opts to begin evaluating the second service, the second service will already have much (if not all) of the information needed to begin providing the second service to the user.

In cases where a user is temporarily evaluating the second service, the user's user data 126 and service data 127 may be temporarily transferred to the second service. Thus, when the second service provides the second service to the user 135, it will use the user's user data and service data. This data may be stored on the data store of the second service for as long as the user is eligible to evaluate the second service. Moreover, if the user determines at some point during the evaluation that he or she wishes to keep using the second service, the user may subscribe to the second service and continue using it as it was used during the evaluation (possibly with more features not provided during the evaluation). In cases where the user opts not to subscribe to the second service, migration engine 105 may determine that the user's evaluation period has expired and, at least in some cases, may transfer the updated user data and service data 127 to the first service. Then, the first service may provide service for the user using the updated user data and service data.

In some embodiments, migration engine 105 may be configured to perform various different calculations including pre-calculating each step that is to be taken to upgrade user 135 from the first service 120 to the second service 130. These pre-calculated steps may be combined to form a workflow. The steps of the workflow may be executed as part of a typical workflow execution. By performing each of the pre-calculated steps as part of the workflow, this ensures data consistency between the user data and the service data of the first service and the user data and the service data of the second service. Accordingly, the same data used in providing the first service will be transferred to and used in providing the second service. Moreover, if the user evaluating the second service opts not to continue using the second service, the data will be transferred back to the first service as part of the workflow execution and the first service will then provide the service to the user.

Figure 4:
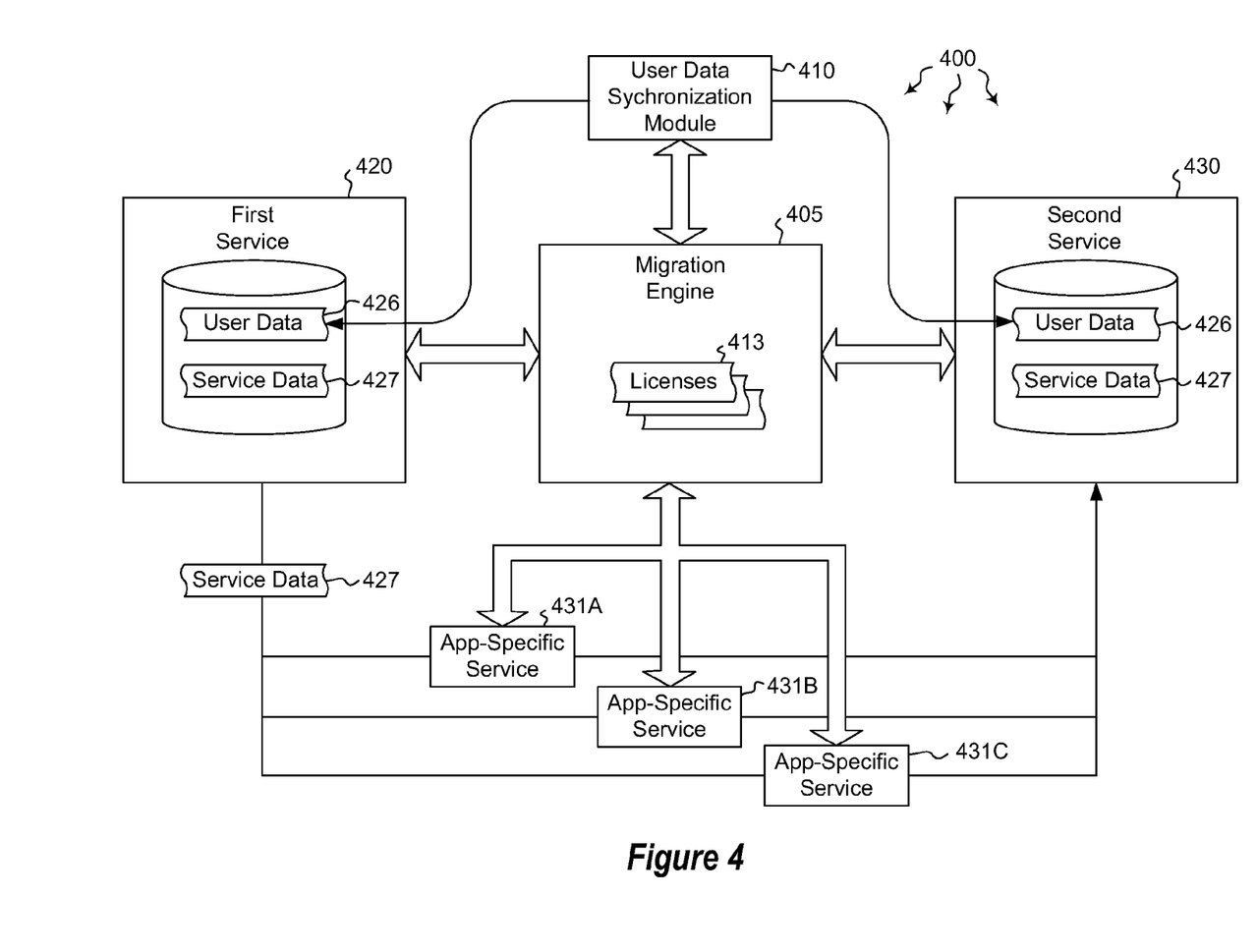
FIG. 4 illustrates an embodiment of the present invention in which application-specific services are used in service migrations.

Returning to FIG. 2, method 200 includes an act of transferring at least a portion of service data used by the first service to the second service (act 230). For example, migration engine 105 may transfer at least a portion of service data 127 used by first service 120 to second service 130. The transfer may be initiated upon receiving transition indication 111 or at some point thereafter. In some cases, as shown in FIG. 4, multiple different application-specific services may be instantiated which are configured to transfer data from one service to another. Application-specific services (or "app-specific services" herein) may be used in cases where a service (e.g. first service 120) provides multiple different applications as part of its service. For instance, first service 120 may provide office suite applications such as word processing, spreadsheet, presentation, email management and other applications. Many other applications of all different types may also be provided by a service. Each of those applications may have a separate app-specific service that is configured to transfer data from a first service to a different one.

Accordingly, first service 420 which includes user data 426 and service data 427 may send the user data and service data for a word processing application (for example) to app-specific service 431A for transfer to second service 430. In some embodiments, second service 430 may be configured to provide at least those applications provided by the first service, as well as other, different applications. Thus, upon receiving the user data 426 and service data 427 for the user for a specific application (e.g. the word processing application), second service 430 may then begin to provide the application using the data transferred by the app-specific service. Although only three app-specific services are shown (431A, 431B and 431C), it will be understood by one skilled in the art that substantially any number of applications may be provided by a service and that a corresponding number of application-specific services may be instantiated to transfer that application's data between services.

Returning again to FIG. 2, method 200 includes an act of synchronizing any changes in the user data that occurred between the user data pre-transfer and the service data transfer, such that the second service is provided using the transferred service data and the synchronized user data (act 240). For example, user data synchronization module 410 of migration engine 405 may synchronize any changes in user data 426 that occurred between the pre-transfer of the user data and the subsequent transfer of the service data. In this manner, the second service 430 may be provided using the transferred service data 427 and the synchronized (and thus up-to-date) user data 426. Any changes to the user data made during synchronization will be finalized in act 250.

In some cases, a scheduler may be used to determine the optimal time to transfer the service data and perform the synchronization. Moreover, the scheduler may schedule the transfer of the service data and then set up synchronization for the determined optimal time. In some embodiments, user data and service data from multiple different users or tenants are batched together for transfer from the first service to the second service. Moreover, the migration engine may include licenses 413 dictating to which services a user has been given access. For instance, the licenses may indicate that a user is to given access to two different applications provided by the second service. Like the user and service data, the licenses may be reconciled upon performing a synchronization.

Moving now to FIG. 3, FIG. 3 illustrates a flowchart of a method 300 for temporarily transitioning a user to a different service for evaluation. The method 300 will now be described with frequent reference to the components and data of environment 100.

Method 300 includes an act of transferring a user's user data from a first service to a second service before receiving an indication that the user intends to evaluate the second service (act 310). For example, migration engine 105 may transfer user 135's user data 126 from first service 120 to second service 130 before receiving transition indication 111 indicating that the user intends to evaluate (and thus transition to) the second service. In some cases, the evaluation period may be configurable and may be extended or cut short from its original time. In other cases, there may be no time limit for the evaluation. The evaluation may allow the user to access any or all of the applications provided by the second service. Moreover, access to the applications provided by the second service may be limited according to policies dictated in licenses 413.

Method 300 includes an act of receiving an indication that the user intends to evaluate the second service (act 320). For example, migration engine 105 may receive transition indication 111 indicating that user 135 intends to evaluate second service 130. This indication may be any type of communication between the user and the migration engine that can communicate the user's intention to evaluate the second service. Other indications may be used to indicate that a group of users is to be transitioned to the second service for evaluation. Thus, the migration engine may perform the steps as listed herein for a group of users instead of just a single user.

In some embodiments, user data may be grouped together for transfer through one or more different channels in parallel. In this manner, data transfer throughput is increased. Additionally or alternatively, a group of users may be batched together for transfer from the first service to the second service, so that service data for the group of users is transferred together. New services may also optionally be added to aid in transferring data.

Method 300 further includes an act of temporarily transferring service data corresponding to the first service to the second service, such that the second service operates using the user's user data and service data from the first service, wherein the user data and service data are updated during operation (act 330). For example, migration engine 105 may temporarily transfer service data 127 of the first service 120 to the second service 130. The transferred service data may be used to provide the second service including any of the second service's applications.

Method 300 also includes an act of determining that the user's evaluation period has ended (act 340). For example, migration engine 105 may determine that user 135's evaluation period has ended. The evaluation period may comprise substantially any timeframe and is fully configurable by a system administrator. The evaluation period may last for minutes, days, weeks or years. In some cases, the evaluation period is specific to each user. Thus, one user may have an evaluation period of a week while another user has an evaluation period of a month. These are, of course, merely examples of possible time frames. Moreover, these time frames may be extended to some customizable end time. Still further, as mentioned above, if a user subscribes to the second service during or at the end of the evaluation period, the evaluation period may, in effect, be extended indefinitely or at least for the life of the user's subscription to the second service.

Method 300 includes an act of transferring the updated user data and service data from the second service to the first service, such that the first service operates using the updated user data and service data (act 350). For example, in some cases, migration engine 105 may transfer updated user data and the service data from second service 130 to first service 120. Upon receiving the updated user data and service data from the second service, the first service may then provide the first service using the updated user data and the service data 127. In this manner, a user (or group of users) may evaluate the second service for a period of time, after which the user(s) are transitioned back to the first service.

Accordingly, methods, systems and computer program products are provided which both efficiently migrate data from one version of a service to another version and temporarily transition a user from a first service to a second service for evaluation. Users may thus transition to a different service quickly and efficiently, as well as temporarily evaluate other services to determine whether to subscribe to those services. Upon determining not to subscribe to the evaluated service, transitioning back to the original, first service is also quick and efficient.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for migrating user data from one version of a service to another version of the service, the method comprising:
    pre-transferring a user's user data from a first service to a second service, wherein the second service is a different version of the first service, and the pre-transfer occurring prior to receiving an indication that the user is to be moved from the first service to the second service;
    receiving the indication that the user of the first service is to be moved to the second service;
    subsequent to receiving the indication, transferring service data used by the first service to the second service;
    determining changes to the user data which occurred at the first service during a time between the pre-transfer of user data to the second service and the subsequent transfer of service data to the second service; and
    updating the pre-transferred user data at the second service to include the changes which occurred to the user data at the first service during the time between the pre-transfer of user data to the second service and the subsequent transfer of service data to the second service, such that the second service is provided to the user using the transferred service data and the updated user data.

2. The method of claim 1, further comprising monitoring a user upgrade status for at least one of the first service users.

3. The method of claim 1, further comprising instantiating a separate, different transfer service for each service that is specially configured to transfer that transfer service's user and service data.

4. The method of claim 1, wherein at least one of the first service users opts to temporarily evaluate the second service.

5. The method of claim 4, wherein the user's service data is temporarily transferred to the second service, such that the second service provides the second service to the user using the user's user data and service data.

6. The method of claim 5, further comprising finalizing the synchronized service changes in the user data.

7. The method of claim 1, further comprising pre-calculating each step that is to be taken to upgrade the user from the first service to the second service.

8. The method of claim 7, wherein the pre-calculated steps are combined to form a workflow.

9. The method of claim 8, wherein the performing the pre-calculated steps of the workflow ensures data consistency between the user data and the service data of the first service and the user data and the service data of the second service.

10. The method of claim 1, further comprising batching a plurality of data migrations from the first service to the second service.

11. The method of claim 1, wherein the first and second services each include licenses dictating usage policies that are to be followed when using the first and second services.

12. The method of claim 11, wherein the licenses are reconciled upon performing the synchronization.

13. The method of claim 1, wherein the second service is a multi-partition, multi-tenant service.

14. The method of claim 1, wherein a scheduler determines the optimal time to transfer the service data and perform the synchronization and schedules the service data transfer and synchronization for the determined optimal time.

15. A computer program product for implementing a method for temporarily moving a user from one service to a different version of the service so that the user can evaluate the different version of the service, the computer program product comprising one or more computer-readable hardware storage devices having stored thereon computer-executable instructions that, when executed by one or more processors of a computing system, cause the computing system to perform the method comprising:
    transferring a user's user data from a first service to a second service before receiving an indication that the user intends to evaluate the second service, wherein the second service is a different version of the first service;
    receiving an indication that the user intends to evaluate the second service;
    temporarily transferring service data corresponding to the first service to the second service, such that the user data and service data are stored on the second service and the second service provides service to the user using the user's user data and service data from the first service stored on the second service;
    during operation of the second service using the user's user data and service data from the first service, updating the user's user data and service data at the second service;
    determining that the user's evaluation period has ended; and
    upon determining the user's evaluation period has ended, determining changes which occurred to the user data and the service data at the first service during operation of the second service using the user's user data and service data from the first service; and
    transferring the updated user data and service data from the second service to the first service, such that the first service provides service to the user using the updated user data and service data from the second service.

16. The computer program product of claim 15, wherein a group of users is transitioned to the second service for evaluation.

17. The computer program product of claim 16, further comprising grouping at least a portion of user data to transfer through one or more different channels in parallel.

18. The computer program product of claim 16, wherein the group of users are batched together for transfer from the first service to the second service, such that service data for the group of users is transferred together.

19. The computer program product of claim 16, wherein one or more new services are added to transfer data.

20. A computer system comprising the following:
one or more processors;
system memory;
one or more computer-readable storage media having stored thereon computer-executable instructions that, when executed by the one or more processors, causes the computing system to perform a method for migrating data from one version of a service to another version of the service, the method comprising:
pre-transferring user data from a first service to a second service, wherein the second service is a different version of the first service, and the pre-transfer occurring prior to receiving an indication that the user is to be moved from the first service to the second service;
monitoring a user upgrade status for the first service user;
receiving an indication that the first service user is to be transitioned to the second service;
pre-calculating each step that is to be performed by the system in order to upgrade the user from the first service to the another version of the service, wherein the pre-calculated steps are combined to form a workflow, the workflow being configured to ensure data consistency between the user data and the service data of the first service and the user data and the service data of the second service;
subsequent to receiving the indication, transferring service data used by the first service to the second service according to steps within the workflow;
determining changes which occurred to the user data at the first service during a time between the pre-transfer of user data to the second service and the subsequent transfer of service data to the second service; and
updating the pre-transferred user data at the second service to include the changes which occurred to the user data at the first service during the time between the pre-transfer of user data to the second service and the subsequent transfer of service data to the second service, such that the second service is provided to the user using the transferred service data and the updated user data.

\* \* \* \* \*